(12) United States Patent
Naoi et al.

(10) Patent No.: US 9,448,570 B2
(45) Date of Patent: Sep. 20, 2016

(54) VOLTAGE FLUCTUATION SUPPRESSING APPARATUS

(71) Applicant: Kabushiki Kaisha Toshiba, Tokyo (JP)

(72) Inventors: Shinya Naoi, Tokyo (JP); Yasuhiro Noro, Tokyo (JP); Yasuyuki Miyazaki, Tokyo (JP); Takahiro Shimoo, Tokyo (JP); Toshiaki Asano, Saitama (JP); Hideyuki Miyaji, Tokyo (JP); Shinji Yurino, Tokyo (JP); Yuji Watanabe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 14/487,198

(22) Filed: Sep. 16, 2014

(65) Prior Publication Data

US 2015/0077068 A1    Mar. 19, 2015

(30) Foreign Application Priority Data

Sep. 17, 2013   (JP) ................. 2013-191704

(51) Int. Cl.

| | |
|---|---|
| *G05F 1/10* | (2006.01) |
| *H02J 3/28* | (2006.01) |
| *G05F 5/00* | (2006.01) |
| *G06F 7/50* | (2006.01) |
| *G06F 7/52* | (2006.01) |
| *H02J 3/16* | (2006.01) |

(52) U.S. Cl.
CPC . *G05F 1/10* (2013.01); *G05F 5/00* (2013.01); *G06F 7/50* (2013.01); *G06F 7/52* (2013.01); *H02J 3/16* (2013.01); *H02J 3/28* (2013.01); *Y02E 40/34* (2013.01)

(58) Field of Classification Search
CPC ............. G05F 1/10; G05F 1/70; G05F 5/00; G06F 7/50; G06F 7/52; H02J 7/00; H02J 7/007; H02J 7/0077; H02J 7/008; H02J 7/0081; H02J 7/0083; B60L 11/1861; G01R 19/16542
USPC ................. 323/205, 207; 363/35; 318/376; 320/132, 134, 162, 163, 164
See application file for complete search history.

(56) References Cited

U.S. PATENT DOCUMENTS 6,563,234 B2 * 5/2003 Hasegawa ................. H02J 3/16
                                                       307/46

FOREIGN PATENT DOCUMENTS

| EP | 2262076 A2 | 12/2010 |
|---|---|---|
| JP | H11262187 A | 9/1999 |

(Continued)

OTHER PUBLICATIONS

Extended European Search Report issued in related European Patent Application No. 14184923.2 mailed Feb. 18, 2015, 5 pages.

*Primary Examiner* — Adolf Berhane
*Assistant Examiner* — Jye-June Lee
(74) *Attorney, Agent, or Firm* — Baker Botts L.L.P.

(57) ABSTRACT

According to an embodiment, a voltage fluctuation suppressing apparatus is provided with a power storage device connected to an electric power system, a basic control unit to control an output of the power storage device, a voltage detector to measure a voltage of a connection point to the electric power system, and an output control unit to divide a control amount to be outputted to the basic control unit into a reactive power command value and an active power command value and to output them. The output control unit is provided with a reactive power upper limit value calculation unit, a reactive power calculation/output unit, and an active power calculation/output unit.

5 Claims, 6 Drawing Sheets

(56) References Cited

FOREIGN PATENT DOCUMENTS

| JP | 2007-300784 A | 11/2007 |
| JP | 2012-039774 A | 2/2012 |
| WO | 2012/152345 A1 | 11/2012 |

* cited by examiner

VOLTAGE FLUCTUATION SUPPRESSING APPARATUS

CROSS-REFERENCE TO RELATED APPLICATION

This application is based upon and claims the benefit of priority from the prior Japanese Patent Application No. 2013-191704, filed on Sep. 17, 2013, the entire contents of which are incorporated herein by reference.

FIELD

Embodiments described herein relate generally to a voltage fluctuation suppressing apparatus.

BACKGROUND

Introduction of a generator using a renewable energy such as photovoltaic power generation (hereinafter, written as "PV"), and wind power generation to a system has been advancing. But, in these power sources, since the output thereof fluctuates depending on the weather, voltage fluctuation resulting from this is generated. Since a voltage exceeds a prescribed value, to cause breakage of an electrical apparatus, it is necessary to suppress voltage fluctuation.

As a method of suppressing voltage fluctuation, there are many methods, such as methods using a power electronics apparatus such as a STATCOM (static synchronous compensator: reactive power compensator) and an SVC (Static Var Compensator: static reactive power compensator), and a method using an apparatus such as an SVR (Step Voltage Regulator: automatic voltage regulator). In the case of using the above-described power electronics apparatus, the voltage fluctuation is suppressed mainly by means of only reactive power. As other methods, a method to use only active power, and a method to use both active power and reactive power can be listed.

However, when an energy storage device represented by a storage battery is used, and voltage fluctuation suppression is performed using active power, since the chargeable amount is determined, when a discharge end state is generated and when a full charge state is generated, the assumed performance might not be obtained.

DETAILED DESCRIPTION

According to an embodiment, a voltage fluctuation suppressing apparatus is provided with a power storage device configured to be connected to an electric power system, a basic control unit configured to control an output of the power storage device, a voltage detector configured to measure a voltage of a connection point to the electric power system, and an output control unit configured to receive an output of the voltage detector as an input, to divide a control amount to be outputted to the basic control unit into a reactive power command value and an active power command value, and to output the reactive power command value and the active power command value. The output control unit is provided with a reactive power upper limit value calculation unit to calculate an upper limit value of the reactive power command value, based on an inputted optional power factor command value, a reactive power calculation/output unit to calculate and output the reactive power command value, based on an inputted optional voltage command value, and an active power calculation/output unit to calculate and output the active power command value. The active power calculation/output unit outputs 0 as the active power command value, when an absolute value of the control value to be outputted to the basic control unit is not more than an absolute value of the upper limit value of the reactive power command value, and outputs a value that is calculated from a prescribed expression and is not 0 as the active power command value, when the absolute value of the control value exceeds the absolute value of the upper limit value of the reactive power command value.

Hereinafter, further embodiments will be specifically described with reference to the drawings.

First Embodiment

A first embodiment will be described using FIG. 1 and FIG. 2.

(Whole Configuration of Voltage Fluctuation Suppressing Apparatus)

Figure 1:
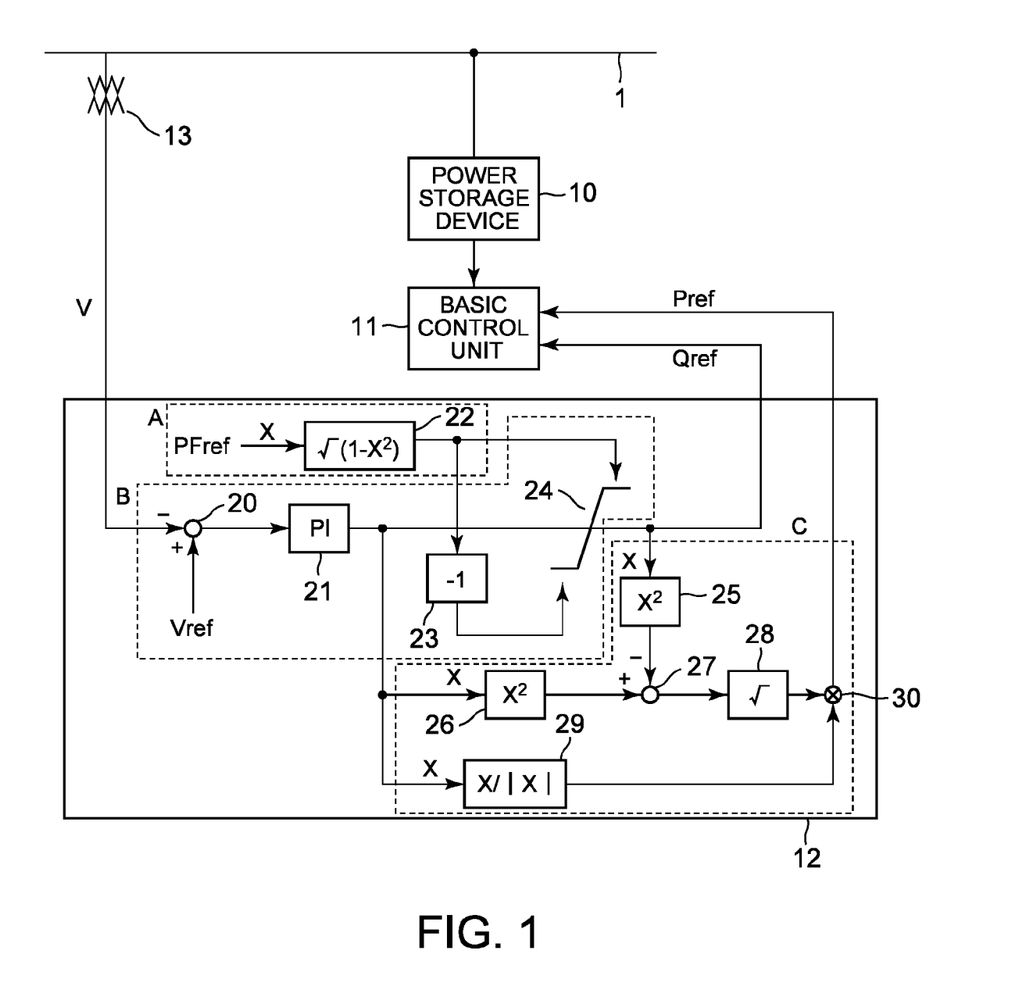
FIG. 1 is a block diagram showing a whole configuration of a voltage fluctuation suppressing apparatus according to a first embodiment.

FIG. 1 is a block diagram showing a whole configuration of a voltage fluctuation suppressing apparatus according to a first embodiment.

The voltage fluctuation suppressing apparatus according to the first embodiment is provided with a power storage device 10 connected to a transmission/distribution line 1, a basic control unit 11 to control charge or discharge of the power storage device 10, a voltage detector 13 to measure a voltage at an interconnection point of the power storage device 10, and an output control unit 12 which inputs a voltage value detected by the voltage detector 13 and outputs the calculation result to the basic control unit 11. Here, as the power storage device 10, a storage battery, a capacitor, a flywheel, and so on can be listed.

(Output Control Unit 12)

The output control unit 12 is composed of a subtracter 20 to subtract a voltage detection value V by the voltage detector 13 from a voltage command value Vref, a PI controller 21 to receive an output of the subtracter 20 as an input, a calculation unit 22 which receives a power factor command value PFref as an input and performs a prescribed calculation, a multiplier 23 to perform positive/negative inversion of an output of the calculation unit 22, a limiter 24 which makes the output of the calculation unit 22 as an upper limit, and an output of the multiplier 23 as a lower limit, and receives an output of the PI controller 21 as an input, a calculation unit 25 to square an output of the limiter 24, a calculation unit 26 to square the output of the PI controller 21, a subtracter 27 to subtract an output of the calculation unit 25 from an output of the calculation unit 26, a calculation unit 28 to output a square root of an output of the subtracter 27, a calculation unit 29 to calculate a sign of the output of the PI controller 21, and a multiplier 30 which multiplies an output of the calculation unit 29 and an output of the calculation unit 28.

When classified by a functional aspect, the above-described configuration elements are sorted into a reactive power upper limit value calculation unit A (the calculation unit 22), a reactive power calculation/output unit B (the subtracter 20, the PI controller 21, the multiplier 23, the limiter 24), and an active power calculation/output unit (a phase 8 calculation unit) C (the calculation unit 25, the calculation unit 26, the subtracter 27, the calculation unit 28, the calculation unit 29, the multiplier 30).

(Power Factor Command Value PFref, Voltage Command Value Vref)

The power factor command value PFref is set to an optional value. Regarding the power factor command value PFref, there is a value which can suppress the voltage fluctuation most effectively, and accordingly, if the power factor command value PFref is set to that value, the voltage fluctuation can be suppressed most effectively. In addition, an optimum power factor depends on a system to which the power storage device 10 is connected.

In addition, the voltage command value Vref may be set to an optional value, or may use a value and so on obtained by calculation. As the latter, a low frequency component of a detected voltage which is obtained by passing the detected voltage through a low-pass filter, and so on can be listed.

(Action)

To begin with, when the voltage command value Vref is inputted to the subtracter 20, the subtracter 20 outputs a difference between the voltage command value Vref and the voltage detection value V by the voltage detector 13 to the PI controller 21. The PI controller 21 outputs a control amount so as to make a voltage of a connection point of the power storage device 10 equal to the voltage command value Vref. This output value is divided into an active power and a reactive power, and for this purpose, the calculation of an expression (1) is performed by the calculation unit 25, the calculation unit 26, the subtracter 27 and the calculation unit 28. In the expression (1), Pref indicates an active power command value to be outputted to the basic control unit 11, Qref indicates a reactive power command value to be outputted to the basic control unit 11, and C indicates a control amount that is the output of the PI controller 21. In addition, it is defined that regarding the active power, the positive is charging and the negative is discharging, and regarding the reactive power, the positive is a capacitive output and the negative is an inductive output.

$$\text{Pref}=\sqrt{(C^2-Q\text{ref}^2)} \quad (1)$$

Here, since the expression (1) can output only a positive value, the output of the PI controller 21 is inputted to the calculation unit 29, and thereby if the control amount C is positive "1" is obtained, and if the control amount C is negative "−1" is obtained, as the output of the calculation unit 29. Accordingly, an output of the calculation unit 28 is multiplied by this value in the multiplier 30, and thus Pref with the same sign as the control amount C can be obtained. At this time, a maximum value Qref' of Qref based on the power factor command value PFref is obtained by an expression (2) in the calculation unit 22 (an action of the reactive power upper limit value calculation unit A).

$$Q\text{ref'}=\sqrt{(1-P\text{Fref}^2)} \quad (2)$$

Using the maximum value Qref', and a minimum value −Qref' which is obtained by inverting the sign of the value Qref', when the control amount C is in the range between the value Qref' and the value Qref', only the reactive power is outputted by the limiter 24 (an action of the reactive power calculation/output unit B). On the other hand, the active power command value Pref is outputted as follows (an action of the active power calculation/output unit C).

When $|C| \leq |Q\text{ref'}|$, Pref=0.

When $|C|>|Q\text{ref}|$, Pref=$\sqrt{(C^2-Q\text{Fref}^2)}$.

That is, while the value of the control amount C is small, since the value from the calculation unit 25 is equal to the value of the calculation unit 26 till the value of the control amount C reaches the limitation (|Qref'|) by the limiter 24, the difference is 0, and accordingly Pref outputted from the multiplier 30 is 0. Next, when the value of the control amount C becomes larger than the limitation (|Qref'|) by the limiter 24, the value from the calculation unit 25 is kept to the value of Qref'$^2$, to cause a difference between the value of Qref'$^2$ and the value from the calculation unit 26 to be generated. When the root of this difference is determined as Pref, when the difference becomes larger, Pref becomes larger, accordingly.

Figure 2:
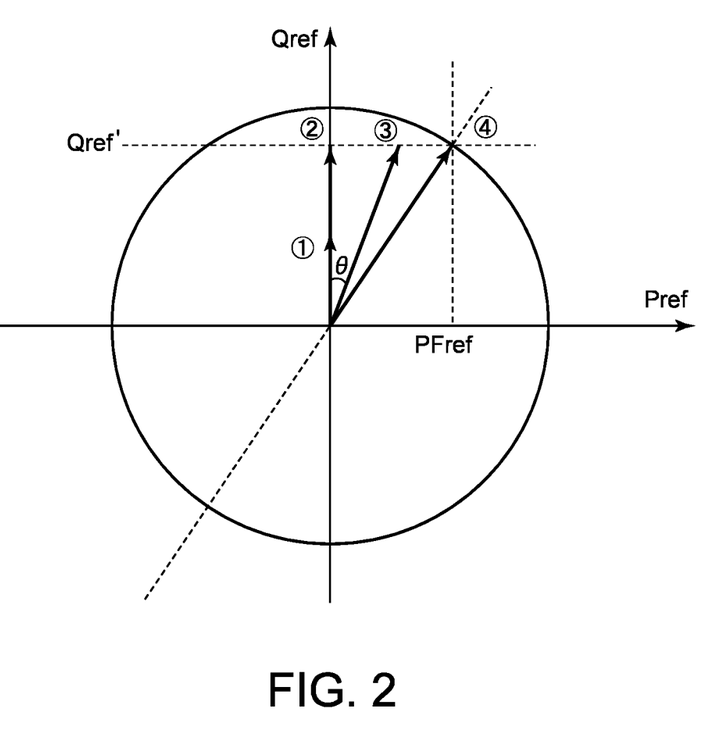
FIG. 2 is an explanation diagram showing an action of the voltage fluctuation suppressing apparatus according to the first embodiment.

When the above-described relation is shown in the drawing, FIG. 2 is obtained. When the control amount C gradually becomes larger from O, the control amount C transits from the origin to states (1), (2), and a state in which |C|=|Qref'| is the state (2). When the control amount C becomes further larger, the control amount C transits to states (3), (4), and when C=1, the control amount C is in the state (4).

(Effects)

According to the present embodiment, when the control amount C is small, the voltage fluctuation is controlled by only the reactive power, and only when the control value C exceeds a constant value, the voltage fluctuation can be suppressed using also the active power. That is, the power storage device 10 performs charge/discharge only when the control amount exceeds the constant value, and thereby a term for performing charge/discharge can be reduced. Accordingly, it becomes possible to greatly reduce the possibility in which a full charge state or a discharge end state is generated, and in addition, it becomes possible to reduce the required capacity of the power storage device 10.

In addition, when the control amount C=1, since the apparatus is controlled at an operating point with the highest voltage suppressing effect as in a conventional manner, it is possible to obtain also the suppressing effect of the voltage fluctuation at the maximum.

Second Embodiment

A second embodiment will be described using FIG. 3. Here, the same symbols are given to the same constituent components as in the first embodiment, and the description thereof will be omitted.

(Whole Configuration of Voltage Fluctuation Suppressing Apparatus

Figure 3:
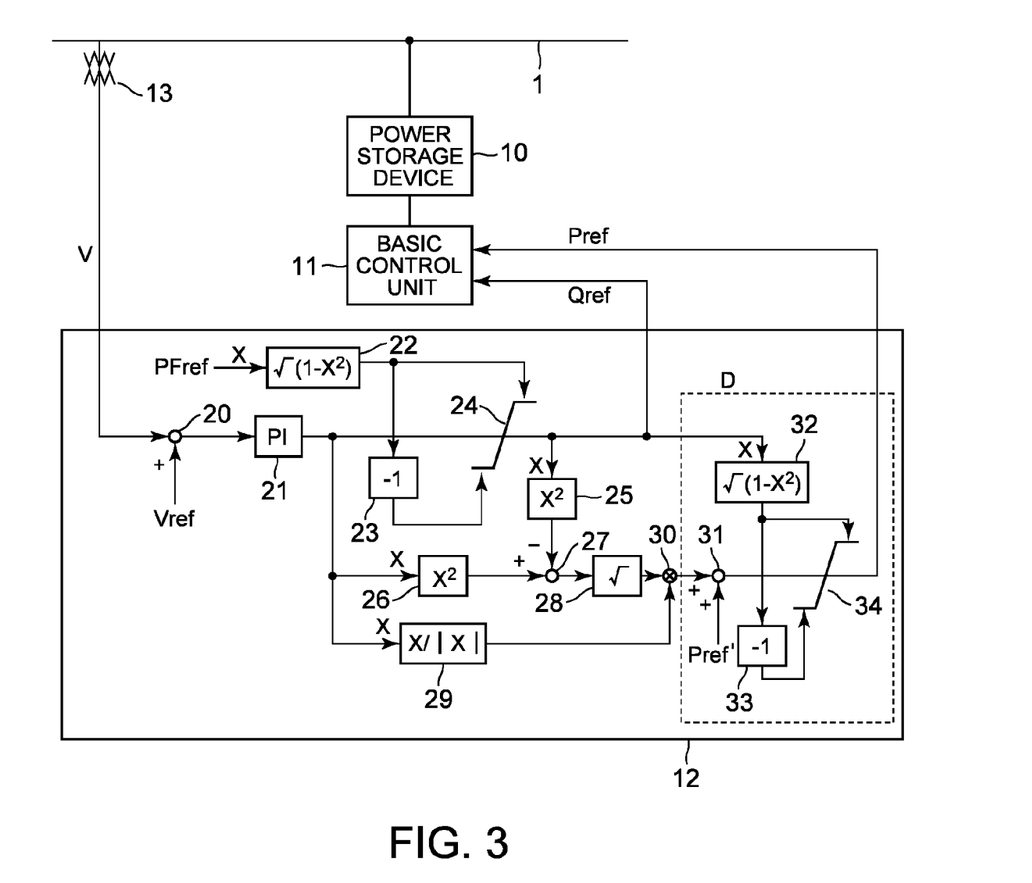
FIG. 3 is a block diagram showing a whole configuration of a voltage fluctuation suppressing apparatus according to a second embodiment.

FIG. 3 is a block diagram showing a whole configuration of a voltage fluctuation suppressing apparatus according to a second embodiment.

The voltage fluctuation suppressing apparatus according to the present embodiment is provided, in addition to the configuration of the first embodiment, with an active power upper limit value control unit D which is composed of an adder 31 to add the output of the multiplier 30 and an optional active power command value Pref', a calculation unit 32 to receive the output of the limiter 24 as an input, a calculation unit 33 to perform positive/negative inversion of an output of the calculation unit 32, and a limiter 34 which makes the output of the calculation unit 32 as an upper limit, and an output of the calculation unit 33 as a lower limit, and receives an output of the adder 31 as an input. Here, the calculation unit 32 performs a following calculation $\sqrt{(1-X^2)}$, where X is the output of the limiter 24.

The active power command value Pref' can be set to an optional value. When it is wanted to use the power storage device 10 by only A [pu], for the reason of peak shift and so on, Pref' is set to −A, so as to charge only A [pu].

(Action)

The basic voltage control portion is the same as described in the first embodiment, and the active power command value Pref' is added to the output of the multiplier 30, and thereby an optional output command value Pref' portion can be outputted. When the output of the active power increases, since the voltage of the connection point is in a rising direction, when the voltage increase is suppressed with the reactive power, the control amount C becomes large, and when the voltage decrease is suppressed with the reactive power, the control amount C becomes small. On the contrary, when the output of the active power decreases, since the voltage of the connection point is in a falling direction, when the voltage increase is suppressed with the reactive power, the control amount C becomes small, and when the voltage decrease is suppressed with the reactive power, the control amount C becomes large.

Here, the control amount C that is the output from the PI controller 21 becomes large, and the reactive power command value Qref is limited by the limiter 24, the active power control portion for voltage control is outputted from the multiplier 30, based on the limited portion, similarly as in the first embodiment (an action of the active power calculation/output unit C). Next, this output from the multiplier 30 and the active power command value Pref' are added in the adder 31. While the added active power command value Pref' is not limited by the limiter 34, it is outputted without change, but when the addition value becomes large, the active power command value is limited by the limiter 34 (an action of the active power upper limit value control unit D). And, when the control amount C=1, the root of the sum of a square of the active power and a square of the reactive power becomes 1 [pu].

(Effects)

According to the present embodiment, while not limited by the upper and lower limit limitations of the voltage control by only the reactive power, the voltage control can be simultaneously realized while outputting the optional active power command value Pref', and when voltage control can not be performed by only the reactive power, it is possible to maintain the optional active power command value Pref' as much as possible.

Accordingly, the voltage control can obtain the same performance as in the first embodiment, and in addition, it is possible to maintain the optional active power command value Pref' as much as possible. By this means, it becomes possible to simultaneously realize the power storage device 10 for voltage fluctuation suppression, as a device for another control, such as a device for output fluctuation suppression control of a power source using renewable energy.

Modification of Second Embodiment

Figure 4:
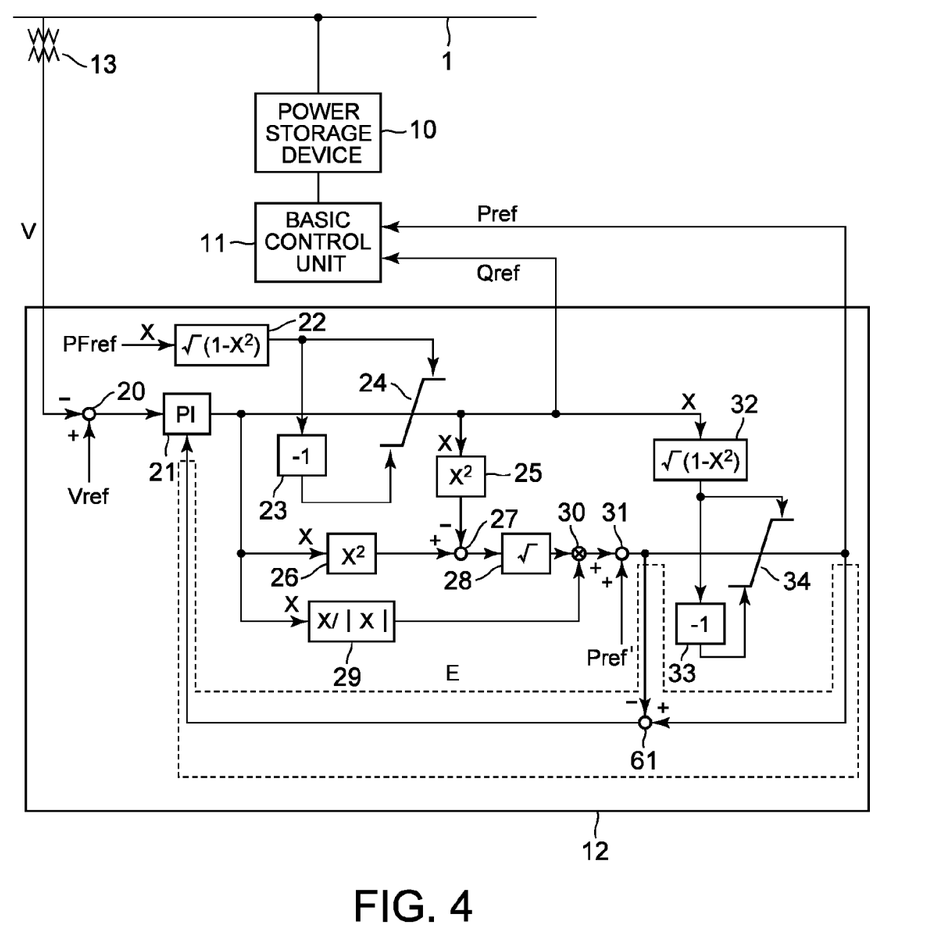
FIG. 4 is a block diagram showing a whole configuration of a voltage fluctuation suppressing apparatus according to a modification of the second embodiment.

A modification of the second embodiment shown in FIG. 3 will be described using FIG. 4.

In this modification, an error component removing unit E composed of a subtracter 61 to obtain a difference between the output of the adder 31 and the output of the limiter 34 is provided, in addition to the configuration shown in FIG. 3.

In this modification, the difference between the output of the adder 31 and the output of the limiter 34 is obtained by the subtracter 61, and when the output of the subtracter 61 is other than 0, that is when the output of the adder 31 does not coincide with the output of the limiter 34, it is determined that the limitation is applied, and the output value of the PI controller 21 is held to a previous value (the output value at the previous stage) (an action of the error component removing unit E).

By this means, limitation is applied to the PI controller 21, and since it can be suppressed that the control deviation remains and thereby the output of the PI controller 21 continues to increase, it is possible to improve the controllability of the apparatus. In addition, the present embodiment is not limited to the above-described method, other method which can obtain the equivalent result can be also used.

Third Embodiment

A third embodiment will be described using FIG. 5. Here, the same symbols are given to the same constituent components as in the second embodiment, and the description thereof will be omitted.

(Whole Configuration of Voltage Fluctuation Suppressing Apparatus)

Figure 5:
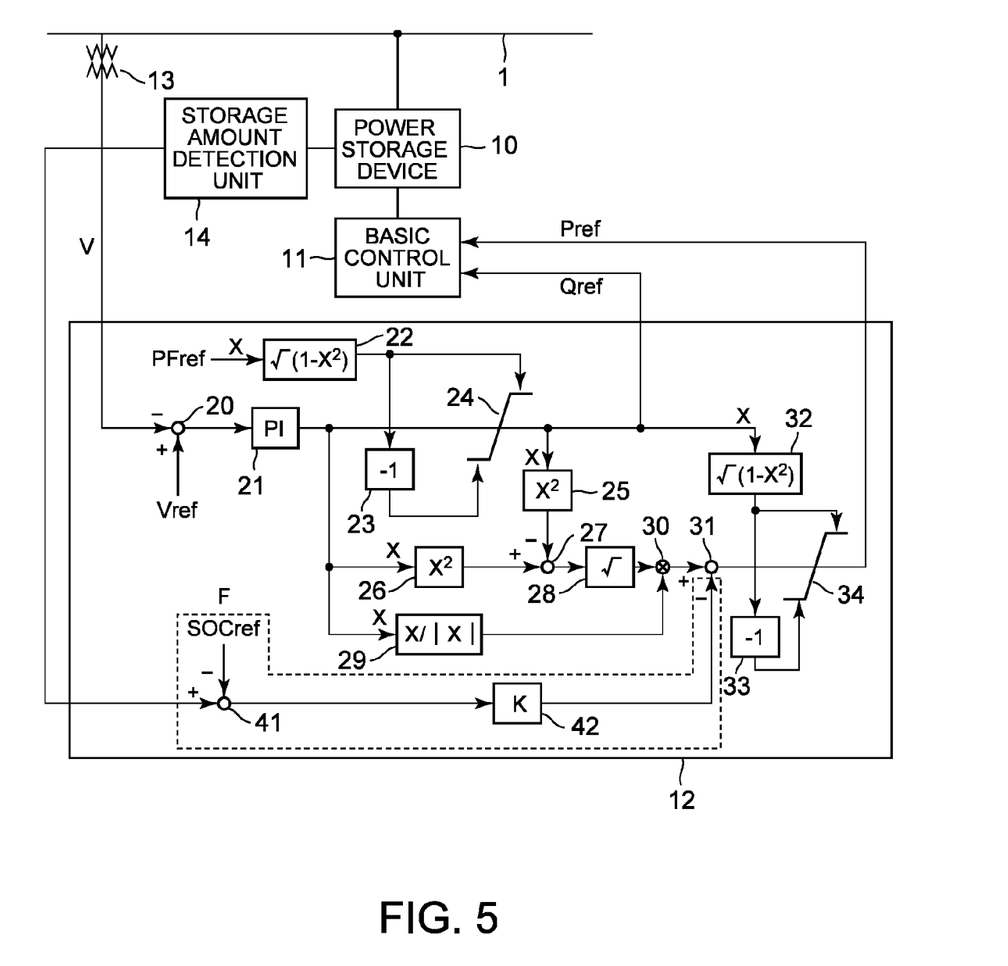
FIG. 5 is a block diagram showing a whole configuration of a voltage fluctuation suppressing apparatus according to a third embodiment.

FIG. 5 is a block diagram showing a whole configuration of a voltage fluctuation suppressing apparatus according to a third embodiment.

The voltage fluctuation suppressing apparatus according to the present embodiment is provided, in addition to the configuration of the second embodiment, with a storage amount detection unit 14 to detect a storage amount of the power storage device 10, an adder 41 to add an optional storage amount target value SOCref and an output of the storage amount detection unit 14, and a calculation unit 42 to receive an output of the adder 41 as an input, and to multiply the input by a constant gain. Here, in the present embodiment, an output from the calculation unit 42 is used in place of the active power command value Pref' of the second embodiment, and the adder 41 and the calculation unit 42 compose a storage amount control unit F for controlling so that the storage amount is constant.

(Action)

When a storage amount of the power storage device 10 deviates from the storage amount target value SOCref, the storage amount control unit F performs control to charge/discharge so that the deviation becomes 0. Regarding the charge/discharge amount, charge/discharge is performed so that the portion deviated from the storage amount target value SOCref becomes 0, and when it becomes impossible to perform voltage control by only the reactive power, the voltage control is realized, while keeping the amount for making the portion deviated from the storage amount target value SOCref to be 0, as much as possible. In the present embodiment, since the storage amount control unit F is used in place of the active power command value Pref' of the second embodiment, the action principle is the same as that of the second embodiment.

According to the present embodiment, the charge/discharge is automatically performed so that the storage amount of the power storage device 10 becomes equal to the optional storage amount target value SOCref, and thereby the storage amount is maintained to SOCref, and it is possible to reduce the possibility that the power storage device 10 for voltage fluctuation suppression becomes in a discharge end state or in a full charge state, more than the first embodiment.

In addition, though the performance of the voltage fluctuation suppression is equivalent to that of the first embodiment, since the term when the power storage device 10 becomes in a discharge end state or in a full charge state is decreased, it is possible to improve the reliability of the apparatus more than the first embodiment.

Fourth Embodiment

A fourth embodiment will be described using FIG. 6. Here, the same symbols are given to the same constituent components as in the third embodiment, and the description thereof will be omitted.

(Whole Configuration of Voltage Fluctuation Suppressing Apparatus)

Figure 6:
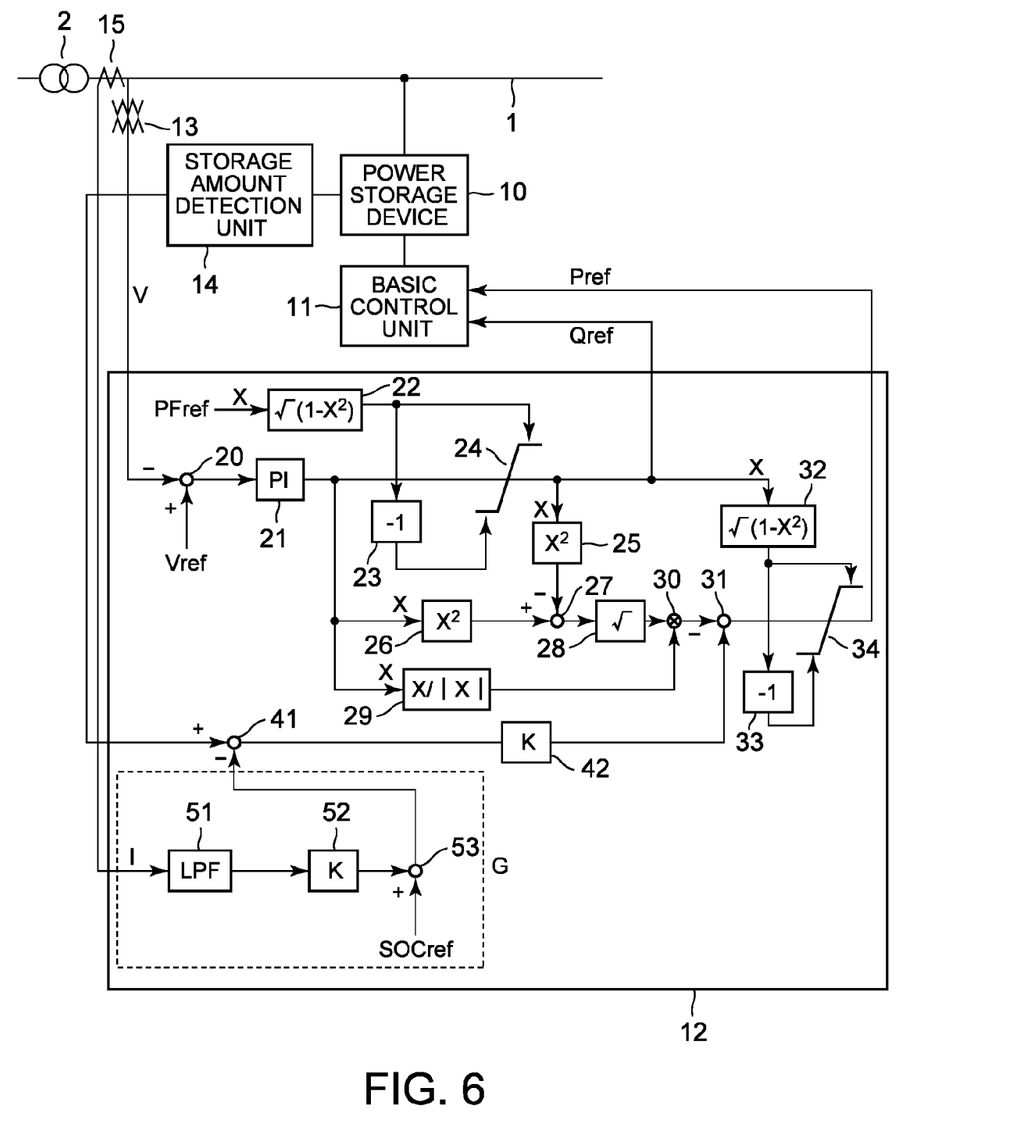
FIG. 6 is a block diagram showing a whole configuration of a voltage fluctuation suppressing apparatus according to a fourth embodiment.

FIG. 6 is a block diagram showing a whole configuration of a voltage fluctuation suppressing apparatus according to a fourth embodiment.

The voltage fluctuation suppressing apparatus according to the present embodiment is provided, in addition to the configuration of the third embodiment, with a current detector 15 to detect a current of the transmission/distribution line 1 provided adjacent to a transformer 2, a low-pass filter 51 to receive an output of the current detector 15 as an input, and to extract only a low frequency component thereof, a calculation unit 52 to multiply an output of the low-pass filter 51 by a constant gain, and a subtracter 53 to subtract an output of the calculation unit 52 from the storage amount target value SOCref. Here, the low-pass filter 51, the calculation unit 52 and the subtracter 53 compose a SOC correction unit G having a function to correct a difference value between SOC and an external power.

(Action)

In a system in which power flows from the transformer 2 to customers, such as a distribution system, when a current flows to a side opposite to the transformer 2 seen from the connection point of the power storage device 10, the voltage at the relevant side tends to fall, and when the direction of the current is inverse, the voltage at the relevant side tends to rise. Accordingly, it is possible to discriminate whether the current is in an increase direction or in a decrease direction on a long-term basis, by detecting the current by the current detector 15 and passing the current through the low-pass filter 51.

When the current is in the increase direction, the voltage will be rising after this, and since the power storage device 10 tries to charge with the voltage control, the correction is made so that the power storage amount target value SOCref is decreased. When the current is in the decrease direction, since the matter reverse to this is generated, the correction is made so that the power storage amount target value SOCref is increased (an action of the SOC correction unit G).

(Effects)

According to the present embodiment, the storage amount target value SOCref is corrected in the direction in which a discharge end state or a full charge state is hardly generated, by reflecting the state of the system, and, it becomes possible to automatically perform charge/discharge so that the storage amount of the power storage device 10 becomes equal to the corrected storage amount target value SOCref. Accordingly, it is possible to reduce the possibility that the power storage device 10 for voltage fluctuation suppression becomes in a discharge end state or a full charge state, more than the third embodiment.

In addition, though the performance of the voltage fluctuation suppression is equivalent to that of the first embodiment, since the term when the power storage device 10 becomes in a discharge end state or a full charge state is decreased, it is possible to improve the reliability of the apparatus more than the third embodiment.

Other Embodiments (1) In the first embodiment (FIG. 1), in the limiter 24, the upper and lower limits have been designated by the maximum value Qref' and the minimum value −Qref' based on the power factor command value PFref, but a reactive power maximum value may be directly inputted instead of the power factor command value PFref, and a reactive power maximum value calculated from an active power maximum value may be inputted.

(2) In the above-described embodiments, the PI controller 21 has been used, but other controller which performs a P control or a PID control may be used, in place of the PI controller 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voltage fluctuation suppressing apparatus comprising:
   a power storage device configured to be connected to an electric power system;
   a basic control unit configured to control an output of the power storage device;
   a voltage detector configured to measure a voltage of a connection point to the electric power system; and
   an output control unit configured to receive an output of the voltage detector as an input, to divide a control amount to be outputted to the basic control unit into a reactive power command value and an active power command value, and to output the reactive power command value and the active power command value;
   the output control unit including,
   a reactive power upper limit value calculation unit to calculate an upper limit value of the reactive power command value, based on an inputted optional power factor command value,
   a reactive power calculation/output unit to calculate and output the reactive power command value, based on an inputted optional voltage command value, and
   an active power calculation/output unit to calculate and output the active power command value, which outputs 0 as the active power command value, when an absolute value of a control value to be outputted to the basic control unit is not more than an absolute value of the upper limit value of the reactive power command value, and outputs a value that is calculated from a prescribed expression and is not 0 as the active power command value, when the absolute value of the control value exceeds the absolute value of the upper limit value of the reactive power command value.

2. The voltage fluctuation suppressing apparatus according to claim 1, wherein:
the output control unit further includes an active power upper limit value control unit to control an upper limit value of the active power command value which is added with an inputted optional active power command value, at a later stage of the active power calculation/output unit.

3. The voltage fluctuation suppressing apparatus according to claim 2, wherein:
the output control unit further includes an error component removing unit which is connected to a later stage of the active power calculation/output unit and a later stage of the active power upper limit value control unit, and obtains a difference between an output value of the active power calculation/output unit and an output value of the active power upper limit value control unit, and holds a previous value when the difference is not 0.

4. The voltage fluctuation suppressing apparatus according to claim 2, further comprising:
a storage amount detection unit configured to detect a storage amount of the power storage device;
wherein the output control unit further includes a storage amount control unit at a place where the optional active power command value is inputted, and
the storage amount control unit performs control to charge/discharge so that a deviation becomes 0, when the deviation between an inputted optional storage amount target value and a detection value of the storage amount detected by the storage amount detection unit is generated.

5. The voltage fluctuation suppressing apparatus according to claim 4, further comprising:
a current detector configured to detect a current of the electric power system;
wherein the output control unit further includes a SOC correction unit at a place where the optional storage amount target value is inputted, and
the SOC correction unit corrects the optional storage amount target value in a direction in which a discharge end state and a full charge state are hardly generated, by reflecting a state of the electric power system from an output of the current detector.

* * * * *